July 12, 1927.

O. H. PERSHING 1,635,498

SEED GERMINATOR

Filed May 12, 1926

O. H. Pershing  INVENTOR

BY *Victor J. Evans*

ATTORNEY

WITNESS:

July 12, 1927.

O. H. PERSHING

SEED GERMINATOR

Filed May 12, 1926

Patented July 12, 1927.

1,635,498

UNITED STATES PATENT OFFICE.

OLYNTHUS HOWARD PERSHING, OF MUNCIE, INDIANA.

SEED GERMINATOR.

Application filed May 12, 1926. Serial No. 108,703.

This invention relates to seed testing or sprouting devices and has for its object the provision of a novel device by means of which samples of seeds of different kinds may be germinated or sprouted to make a test for ascertaining whether or not the bulk of the seeds from which the samples are drawn are of good or inferior quality, this being an operation well known to seedmen.
An important object is to provide a device for this purpose equipped with means whereby a constant and automatic supply of water will be caused to permeate the textile, fibrous, sand, gravel or other absorbent material in or upon which are placed the seeds to be tested, the moisture supplying means being of the barometric type such as is used in connection with automatic poultry waterers and the like, the arrangement in the present instance being such that water is supplied freely through the material to a certain depth and caused to permeate the remainder by capillary action so that conditions will remain practically constant or uniform for insuring the maximum efficiency of the device in germinating the seeds especially inasmuch as adequate ventilating means is provided.

An additional object is to provide a device of this character which will be simple and inexpensive in manufacture, easy to use, positive in action, efficient and durable in service, and a general improvement in the art.
With the above and other objects and advantages in view, the invention consists in the details of construction and the arrangement of parts to be hereinafter more fully described and claimed, and illustrated in the accompanying drawings, in which:

Figure 1:
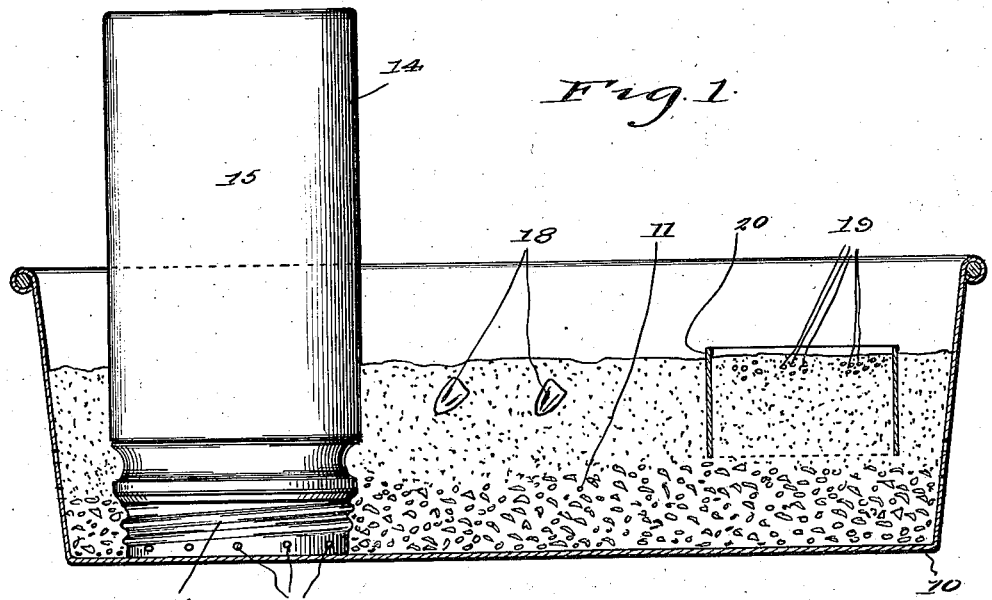
Figure 1 is a vertical longitudinal section through one form of the device ready for use.
Figure 2:
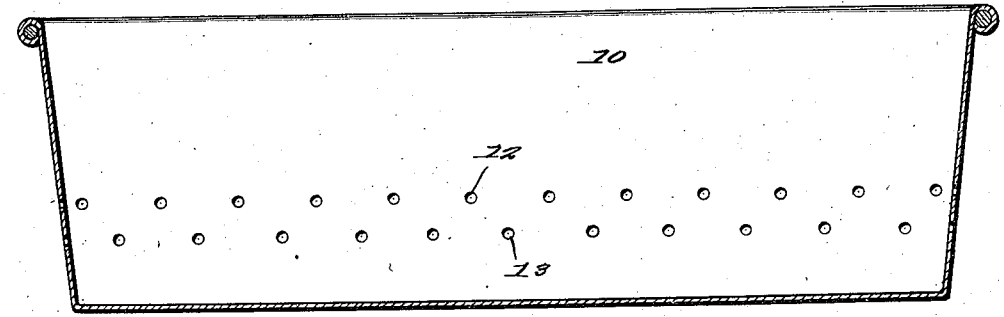
Figure 2 is a section through the pan alone.
Figure 3:
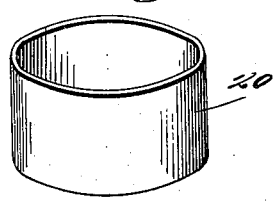
Figure 3 is a perspective view of one of the cups.
Figure 4:
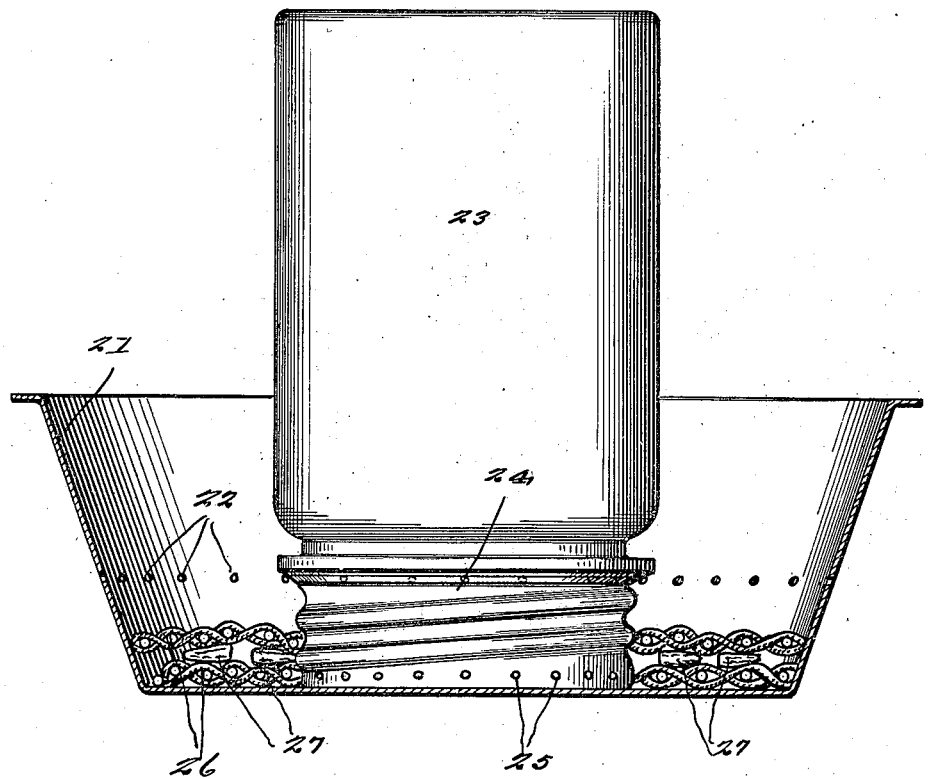

Figure 4 is a cross section through another form.
Referring more particularly to the drawings, and especially Figures 1 to 3, I have shown the device as comprising a pan 10 of suitable size, shape and material adapted to be filled to any desired depth with gravel, sand, suitable soil or other absorbent material indicated at 11. At a point spaced above its bottom the pan is provided in its sides and ends with upper and lower rows or series of holes 12 and 13.

Disposable in one end of the pan to rest upon the bottom thereof is a fountain or reservoir structure 14 consisting of a receptacle 15 having a cap or other closure 16 perforated at its side edges as shown at 17. This receptacle is to be filled with water and placed within the pan prior to the filling thereof with the soil or other material and the water within the receptacle will flow slowly out through the perforations 17 and soak or thoroughly wet the bottom portion of the material, in fact up to the level of the lower series of holes 13. Above this point or level the material becomes moistened by the capillary action, the moisture being drawn upwardly and of course slowly evaporating from the surface of the material. The upper row of holes 12 will provide means for ventilation whereas the lower row will act to prevent the level of saturation by free water from becoming excessively high to avoid drowning any sprouted seeds at the upper portion of the material.

Large seeds indicated at 18 may be pressed downwardly into the material 11 to any desired depth as indicated in Figure 1 and disposed individually whereas smaller seeds indicated at 19 are generally deposited in pinches onto the surface of the material and then lightly pressed in.

If desired, use may be made of any number of cups 20 which are either bottomless as shown or perforated to permit passage of moisture therethrough, the utilization of such cups providing means whereby different kinds of seeds may be kept separate. Obviously, after the proper length of time the seeds placed within the material will sprout if fertile and by inspecting them it may be ascertained whether or not the bulk of the seeds from which those have been drawn for the test will be of good or poor quality. Of course the device need not be used for testing as it can be employed to sprout seeds for any purpose and there is no limitation in this respect.

In Figure 4, I have illustrated what I may call the preferred embodiment of the invention, and referring to this figure it will be observed that I have provided a pan 21 which, though of any desired size and shape, as well as material, is preferably circular in plan with outwardly flaring sides provided with a series of holes 22 of desired diameter spaced a considerable distance above the bottom. Located within the center of this pan and simply resting upon the bottom thereof is a reservoir or fountain device which may in ordinary practice be an ordinary fruit jar 23 having a cap 24 screwed thereonto, as is customary, the cap being provided with a series of holes 25 near its closed end for the outlet of water which is initially placed within the reservoir or jar. Located within the bottom portion of the pan 21 are strips, sheets, pieces, masses or the like of burlap indicated at 26, it being of course conceivable that any other textile or fibrous material of an equivalent nature may be used though burlap is specified as being highly suitable for the purpose and also as being very inexpensive and easily obtainable. The seeds to be germinated, which seeds are indicated at 27, are preferably located between the layers, strips or pieces of burlap or other material and it is quite clear that the water seeping out of the reservoir through the perforations 25 in the cover 24 thereof will effectually saturate or moisten the burlap or other material and thereby moisten the seed to such an extent that they will germinate in the customary and well known manner. Obviously, the holes 22 permit the escape of any surplus water which may leave the jar so that there will be always a proper supply.

While I have shown and described the preferred embodiment of the invention, it should be understood that I reserve the right to make such changes in the form, construction and arrangement of parts as will not depart from the spirit of the invention or the scope of the subjoined claim.

Having thus described the invention, I claim:—

A device of the character described comprising a container filled with permeable material, a barometric fountain means within the container for constantly supplying water to the material therein at the lower portion of said material, said container being provided with upper and lower series of holes, the lower series acting to prevent excessive rise of the level of free water entering the material and the upper series providing ventilating means.

In testimony whereof I affix my signature.

OLYNTHUS HOWARD PERSHING.